INVENTOR.
John Zoltai
BY
Lane, Aitken, Dunner + Ziems
ATTORNEYS

July 30, 1968 J. ZOLTAI 3,394,742

WIRE WRAPPING AND STRIPPING TOOLS

Filed March 18, 1966 3 Sheets-Sheet 2

INVENTOR.
John Zoltai
BY
Lane, Aitken, Dunner & Ziems
ATTORNEYS

INVENTOR.
John Zoltai
BY
Lane, Aitken, Dunner & Ziems
ATTORNEYS

United States Patent Office 3,394,742
Patented July 30, 1968

3,394,742
WIRE WRAPPING AND STRIPPING TOOLS
John Zoltai, Santa Fe, N. Mex., assignor of fifteen percent to Richard S. Hubbell, Tucson, Ariz.
Filed Mar. 18, 1966, Ser. No. 535,476
9 Claims. (Cl. 140—124)

This invention relates to wire wrapping and more particularly, to a wire wrapping method and apparatus for applying insulated wire leads to terminal posts employed in electrical and electronic devices.

In accordance with the present invention, a continuous electric wire, having a conductive core covered by a sheath of insulating material, may be connected electrically with a plurality of successive terminal posts by severing the insulation circumferentially the conductive core and then compressing the insulation axially, while wrapping the wire about a terminal post, to provide an exposed length of the core in direct contact with the terminal. A tool, by which this stripping and wrapping operation may be effected most expeditiously, involves a tubular member having a pair of end portions, which when brought together define a central terminal post socket and an eccentric wire receiving apertures, the latter having knife-like edges and being dimensioned to cut through the insulation sheath on the wire without cutting the conductive core. Hence rotation of the tool about the terminal post will operate to expose the conductive core and wrap the wire about the terminal to establish electrical contact between the core and the terminal.

Among the objects of the present invention, therefore, are: the provision of a novel and highly effective method for applying insulated conductors to terminal posts in a manner to ensure good electrical contact; the provision of a unique, easily manipulated tool to practice the method aforementioned; and to provide a tool of relatively few parts that may be operated in a variety of ways to apply wire leads to terminal posts.

Other objects and further scope of applicability of the present invention will become apparent from the detailed description to follow, taken in conjunction with the accompanying drawings in which.

Figure 1:
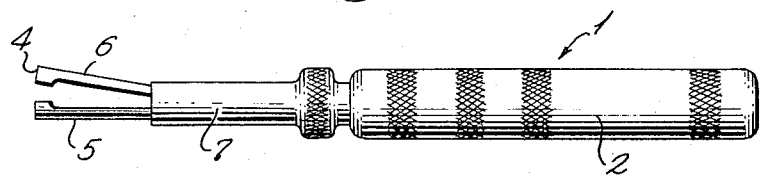
FIG. 1 is a side view of the tool of this invention adjusted to one state of operation.

As shown in FIGS. 1–7, the improved wire wrapping tool, generally indicated by the reference numeral 1, is provided with a knurled handle 2 which is hollow and open at both ends. A wire wrapping head 3 is securely attached to the handle 2 in any suitable manner. The wire wrapping head 3 is an elongated cylindrical tube having an end portion which is bifurcated to form two jaw members 5 and 6. This is accomplished by cutting the end portion 4 of the wire wrapping head 3 in a plane passing through its axis and along approximately ⅓ of its length. One of the jaw members 6 is then bent out as an angle of approximately 15° and heat treated to a resilient spring temper. The other jaw member 5, in the embodiment shown, remains parallel with the tool axis.

Figure 2:
FIG. 2 is a side view of the tool shown in FIG. 1 but in a different operative state.
Figure 5:
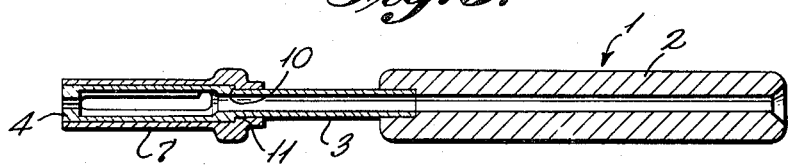
FIG. 5 is a cross-section taken along the line 5—5 of FIG. 4.
Figure 3:
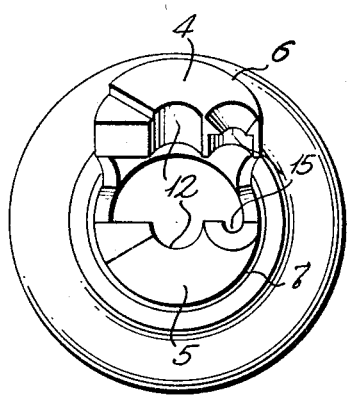
FIG. 3 is an end view of the tool as shown in FIG. 1.
Figure 4:
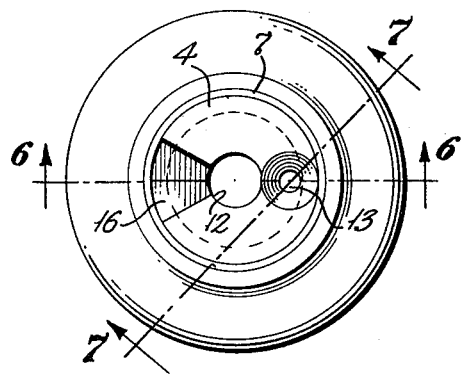
FIG. 4 is an end view of the tool as shown in FIG. 2.

A tubular sleeve 7 is slidably mounted on the lead wrapping head 3 and maintained thereon by an internal shoulder 10 on the sleeve 7 and a complementing external shoulder 11 on the lead wrapping head 3. When the sleeve 7 is in an upward or retracted position on the lead wrapping head 3, as shown in FIG. 1, the jaw members 5 and 6 are sprung apart as shown in FIGS. 1 and 3. When the sleeve 7 is advanced toward the end portion 4 or to its lower position, as shown in FIG. 2, the jaw members 5 and 6 are forced together within the sleeve, as shown in FIGS. 2, 4 and 5.

Figure 6:
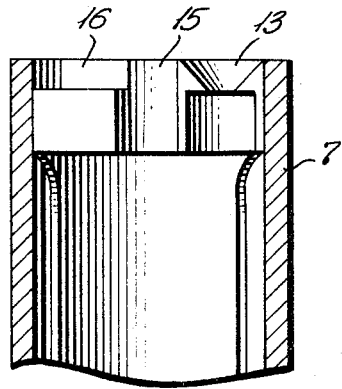
FIG. 6 is an enlarged sectional view of the lower end of the tool, as shown in FIG. 1, taken along the line 6—6 of FIG. 4.
Figure 7:
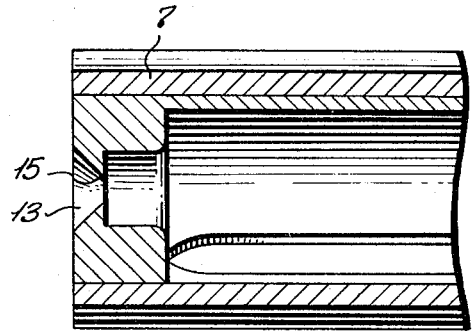
FIG. 7 is an enlarged sectional view of the end portion of the tool as shown in FIG. 1, taken along the line 7—7 of FIG. 4.

The end portion 4 of the lead wrapping head is drilled to form a central terminal receiving hole 12 and an eccentric wire receiving hole 13, both of these holes being bisected by the diametric plane establishing the mutually facing sides of the jaw members 5 and 6. The hole 12 is, as indicated, located at the axial center of the tool 1 and acts as a socket to receive a terminal post. This connection with the terminal post functions as a pivot point about which the tool may be rotated during the wrapping operation. The wire receiving hole 13, being eccentric, is located about half-way between the socket hole 12 and the edge of the lead wrapping head 3. The hole 13 is chamfered as shown in FIG. 6 from the outside to establish a sharp cutting edge 15 on the inner portion of the chamfer. The diameter of the hole 13 at the edge 15 is equal to the diameter of the conductor core of an insulated wire to be wrapped. The end portion 4 of the lead wrapping head 3 is also provided with a step 16 cut at an angle of 60° as shown in FIG. 5 within the closed end section 4. This step leads into the socket hole 12 and greatly simplifies the placing of the terminal post into the socket hole.

Figure 14:
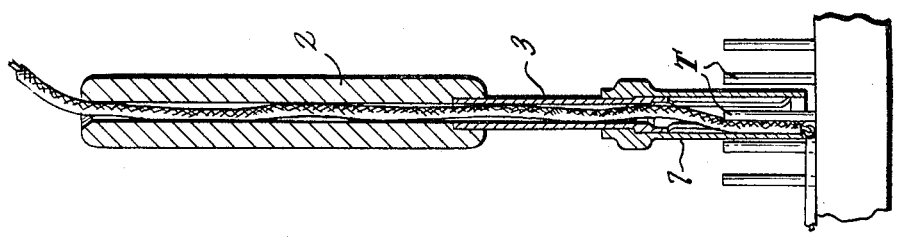
FIG. 14 is a sectional view of the tool of this invention placed on a terminal post.
Figure 13:
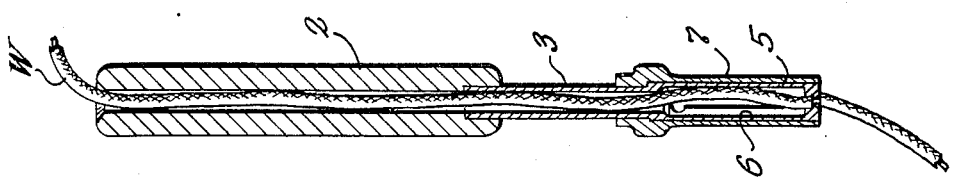
FIG. 13 is the sectional view showing the tool in the closed position.
Figure 12:
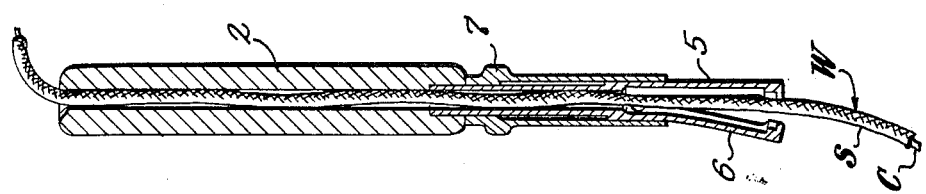
FIG. 12 is a sectional view of the invention in its opened position with an insulated lead therein.

To employ the tool 1, as thus described, in the practice of the method of this invention, a wire W having a conductive core C and sheath S of insulating material, such as plastic or the like, is fed through the handle 2 and the wrapping head 3 from top to bottom of the tool as shown in FIG. 12 of the drawings. In practice, the wire may be drawn directly from a coil (not shown) or other sources, without cutting. When a predetermined length of the wire projects from the end portion 4, the sleeve 7 is advanced to the position shown in FIG. 13, for example, to close the jaw members so that the cutting edges 15 of the hole 13 penetrate through the sheath S. Then, the tool is placed over a terminal post T, as shown in FIG. 14, so that the post is received in the hole 12. While holding the free end of the wire, the tool 1 is rotated, using the knurled handle 2 to wrap the wire about the terminal post. Since the insulative sheath S on the inside of the tool cannot pass through the hole 13, it is compressed axially by an amount equal to the length of the core C wrapped about the post. If the wire is to connect the terminal T with other successive terminals, the sleeve 7 is retracted and the tool moved onto the wire by an amount corresponding to the distance between terminals. The operation referred to above is then repeated. When the last terminal is wrapped, the wire W is cut and trimmed to complete the operation. Thus, it will be appreciated that the insulated wire W is electrically connected to successive terminals without actually removing any of the insulating sheath S. Instead the sheath is merely severed and then compressed axially on the core C to leave a length of uninsulated wire sufficient to effect the electrical contact.

Figure 8:
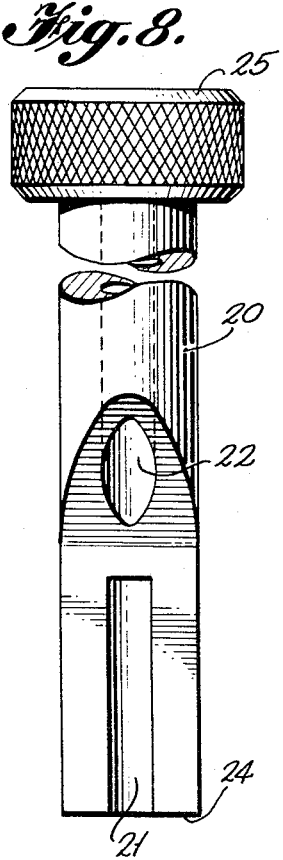
FIG. 8 is a partial view of a wire cutting member usable with the tool of this invention.
Figure 9:
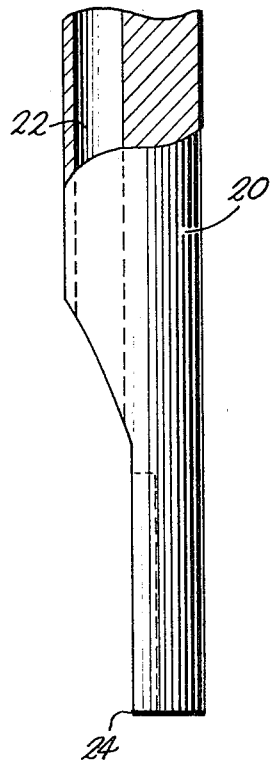
FIG. 9 is a side view of the member shown in FIG. 8.
Figure 10:
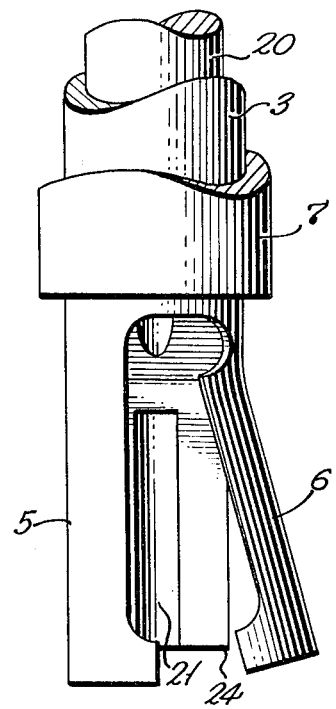
FIG. 10 is a partial view of the end portion of the tool of this invention with the cutting member shown in FIG. 8 mounted therein.
Figure 15:
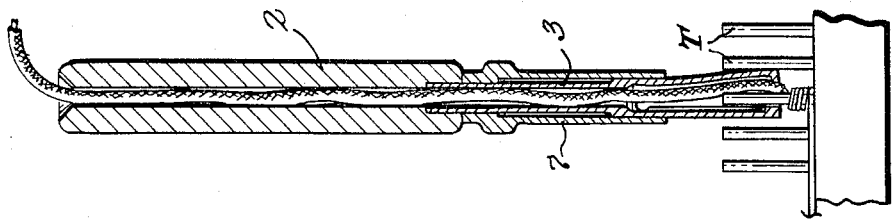
FIG. 15 is a sectional view of the tool after wrapping the wire around the post.

To facilitate cutting of the insulated wire W after it has been wrapped as described above, a wire cutting member 20, shown in FIG. 8, may be provided in the tubular cavity of the wrapping head 3 and handle 2. The cutting member 20 is provided with a terminal post clearing hole 21 and a feed-through hole 22 for insulated wire. The lower portion 23 of the cutting member is machined flat so as to form a shearing edge 24. While the tool is wrapping, the cutting member 20 rotates with the lead wrapping head. When the required turns are completed, the wrapping head 3 is held stationary, and by means of a knurled handle 25, for example, the cutting member 20 is rotated approximately 120° to shear the wire by the action of the shearing edge 24 cooperating with the edge 15 in the cutting hole 13. The wire may then be removed through the feed-through hole 22 and out the hollow handle 2.

Figure 11:
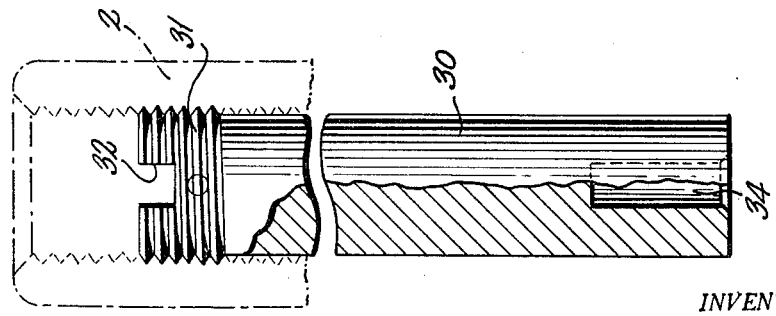
FIG. 11 is a view in partial cross-section, showing a metering device usable with the tool of this invention.

A further modification of the tool includes the provision of a metering stop 30 shown in FIG. 11 which may be used when only a single terminal is to be wired. The metering stop is adapted to be fitted within the hollow handle 2, which is threaded for this application, and the wrapping head 3. The top portion of the metering stop is provided with threads 31 to engage the threads within the hollow handle and a slot 32 designed to accommodate a conventional type screwdriver. The body portion of the metering stop is cylindrical in shape, the lower end being provided with a terminal clearance hole 34. It will be apparent that by adjusting the threads on the metering stop 30 it may be raised or lowered within the tool as desired.

In use, the length of the wire to be wrapped on a terminal is first calculated and the metering stop 30 adjusted by threading it upwardly or downwardly within the handle 2. The wire is then fed inwardly through the open jaws 5 and 6 until the end thereof engages the metering stop 30. The sleeve 7 is moved to close the jaws 5 and 6 so that the wire is received in the hole 13 and the wrapping operation carried out as described above. As the wire is wrapped about a terminal post, in this instance, the sheath of insulation is pulled from the free end of the lead by means of the cutting edge 15 into the tool for subsequent disposal.

Thus, it becomes apparent that the tool of the present invention effects in a single continuous cycle, complete wrapping of a lead wire about a terminal post without any damage to the post or lead and without the necessity of separately stripping the insulation from the wire. Moreover, because of the simple design and minimal steps required for operation the tool of the present invention is vastly superior to those previously utilized.

Since many variations of the wrapping tool of this invention are possible, it is to be distinctly understood that the foregoing description is illustrative of preferred embodiments only, not limiting, and that the true spirit and scope of the present invention are to be determined by the appended claims.

The invention claimed is:

1. A tool for applying a wire, having a conductive core covered by an insulating sheath, to a terminal post, said tool comprising: means defining a pair of jaws movable between an open position and a closed position; and means to move said jaws to either of said positions, said jaws having mutually facing portions formed to provide, when in said closed position, a terminal receiving hole and wire receiving hole spaced from said terminal receiving hole, the edges of said wire receiving hole establishing cutting edges and being dimensioned to cut the insulating sheath on the wire circumferentially when said jaws are moved to said closed position, whereby rotation of said jaws about a terminal post positioned in said terminal receiving hole, operates to wrap the core of the wire about the post while compressing the insulating sheath axially on the wire to enable direct electrical contact between the terminal and the core wrapped thereon.

2. The apparatus recited in claim 1 in which said jaws are formed on the end of a bifurcated tubular member.

3. The apparatus recited in claim 2 in which said jaws are spring-biased to said open position and wherein said means to move said jaws comprises a sleeve slidably mounted on said tubular member.

4. The apparatus recited in claim 2 in which said tubular member is supported on a handle having a through-bore communicating with said tubular member.

5. The apparatus recited in claim 1 including means to cut the wire core and sheath.

6. The apparatus recited in claim 5 in which said cutting means includes a member rotatable relative to said jaws and having an edge cooperable with the cutting edges of said wire receiving hole.

7. A tool for applying insulated conductor wire to a terminal post comprising a hollow handle adapted to receive the wire, a tubular wrapping head having an opened end attached to said handle and a bifurcated end section formed by a cut perpendicular to the tubular axis, said end having two holes, one hole forming a socket to engage the terminal post at the radial center of the head, the other hole having a chamfered cutting edge to receive the lead wire and cut the insulation thereon, said other hole being eccentric to the first hole and a tubular sleeve slidably mounted on said wrapping head and adapted to close said bifurcated split end members thereby closing the cutting hole around the lead wire to cut the insulation thereon.

8. The tool of claim 7 including a metering stop member positioned within the cylindrical cavity of the tubular head and having a central cavity to fit over a terminal post and a threaded upper section adapted to fit into a threaded section of the handle whereby the thread position of the metering stop within said handle controls the amount of lead wire fed into the lead wrapping head.

9. The method of electrically connecting a continuous wire lead, having a conductive core and an outer sheath of insulating material, successive to a plurality of terminal posts, said method comprising the steps of: circumferentially cutting the insulation sheath, compressing said sheath axially on the score to provide an exposed length of said core about one of said terminal posts, and repeating said cutting, compressing and wrapping steps to effect connection of said core successively to the others of the terminal posts.

References Cited

UNITED STATES PATENTS 2,885,764  5/1959  Shulters et al. _____ 81—9.5
2,898,952  8/1959  Lovecky _____ 140—124
3,044,333  7/1962  Broske _____ 81—9.5

CHARLES W. LANHAM, *Primary Examiner.*

L. A. LARSON, *Assistant Examiner.*

UNITED STATES PATENT OFFICE
CERTIFICATE OF CORRECTION

Patent No. 3,394,742

July 30, 1968

John Zoltai

It is certified that error appears in the above identified patent and that said Letters Patent are hereby corrected as shown below:

Column 4, lines 56 and 57, "score to provide an exposed length of said core about" should read -- core to provide an exposed length of said core, wrapping the exposed length of said core about --.

Signed and sealed this 30th day of December 1969.

(SEAL)

Attest:

Edward M. Fletcher, Jr.

Attesting Officer

WILLIAM E. SCHUYLER, JR.

Commissioner of Patents